(12) United States Patent
Chen

(10) Patent No.: US 7,572,023 B2
(45) Date of Patent: Aug. 11, 2009

(54) KEY MODULE WITH MULTI-LAYER LIGHT GUIDING STRUCTURE

(75) Inventor: Ko-Ju Chen, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 0 days.

(21) Appl. No.: 12/139,786

(22) Filed: Jun. 16, 2008

(65) Prior Publication Data
US 2008/0247152 A1 Oct. 9, 2008

Related U.S. Application Data

(62) Division of application No. 11/560,962, filed on Nov. 17, 2006, now abandoned.

(51) Int. Cl.
*G01D 11/28* (2006.01)

(52) U.S. Cl. .............................. 362/26; 362/24; 362/27; 362/29; 362/30; 379/368; 345/170; 345/176

(58) Field of Classification Search .................. 362/24, 362/26, 27, 29, 30, 86–88, 602–605, 612, 362/629; 200/310–317; 379/368; 345/170, 345/176
See application file for complete search history.

(56) References Cited

U.S. PATENT DOCUMENTS

| | | | | | |
|---|---|---|---|---|---|
| 4,124,879 | A | * | 11/1978 | Schoemer | 362/26 |
| 5,130,897 | A | * | 7/1992 | Kuzma | 362/24 |
| 5,568,367 | A | * | 10/1996 | Park | 362/109 |
| 7,283,066 | B2 | * | 10/2007 | Shipman | 341/22 |
| 2003/0090885 | A1 | * | 5/2003 | Hsu | 362/24 |

* cited by examiner

*Primary Examiner*—Sandra L O'Shea
*Assistant Examiner*—Danielle Allen

(57) ABSTRACT

A key module with a multi-layer light guiding structure includes a plurality of keys, light guiding structure and a plurality of light blocks corresponding to the light guiding structure. The light guiding structure includes a plurality of light guiding plates. Each of the light guiding plate includes at least one light guiding strip corresponding to specific keys, which are staggered to each other or corresponding to each other. The light guiding strip is provided with a color layer. An electronic device using the key module individually or selectively lights light emitting elements for each layer of the light guiding plates. Therefore, different lights are emitted from the light guiding strips or a mixed light is produced from the light guiding strips to illuminate the keys. The keys have lights of different color to manifest symbols or alphabets on the keys.

12 Claims, 6 Drawing Sheets

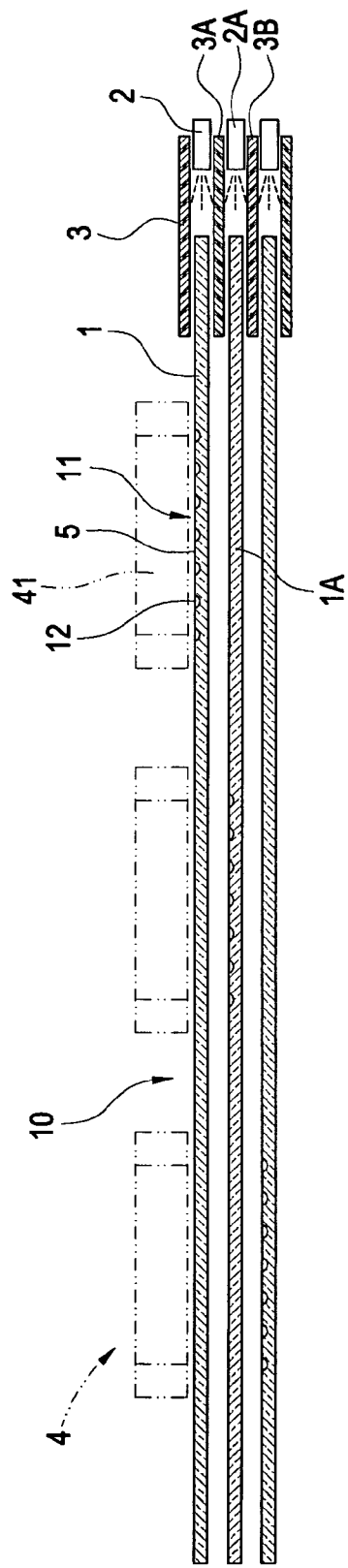
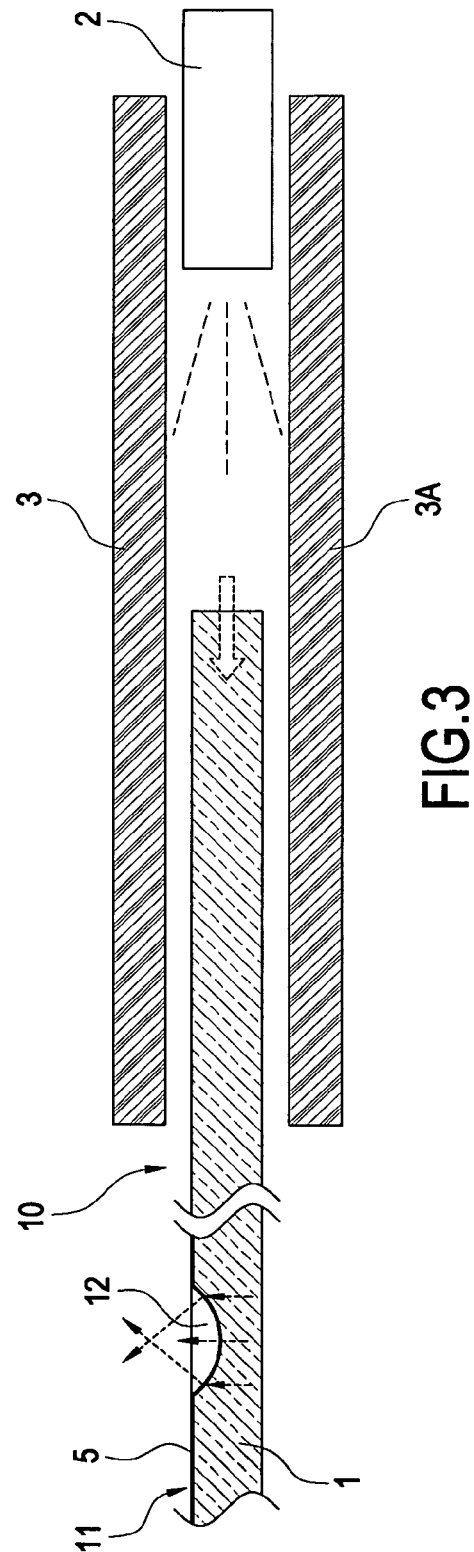
FIG.2
FIG.3

KEY MODULE WITH MULTI-LAYER LIGHT GUIDING STRUCTURE

This application is a divisional application of U.S. patent application Ser. No. 11/560,962, filed on Nov. 17, 2006 now abandoned.

BACKGROUND OF THE INVENTION

1. Field of the Invention

The present invention relates to a key module, more particularly, to a key module with a multi-layer light guiding structure

2. Description of Prior Art

Portable electronic device such as mobile phones and personal digital assistants (PDA) are popular information appliances. In those portable electronic devices, keys are often used for user input interface to input data and select function of the electronic devices.

The key in the prior art electronic device generally comprises a backlight to provide illumination for user in dark environment. Therefore, user can correctly identify key. The conventional backlight comprises a transparent light guide and a light emitting diode (LED) in the electronic device. Light emitted from the LED is guided by the light guide to distribute over bottom of each key. Therefore, symbols or alphabet can be clearly displayed on the key.

The LED in backlight application is generally of mono color, therefore, symbols or alphabet formed on top of the key are printed with different color to provide colorful display effect. Alternatively, a multiple-color LED is used for a key when a specific color effect is demanded for the key. The manufacture time and cost for above two approaches are burden for the manufacturer.

As the progress of technology, the electronic device is also provided with more function for user. For example, mobile phone can be used for photo, game and video playback. However, the backlight in the mobile phone illuminates symbols and alphabet on all keys. Therefore, user cannot identify the key for game control, photo shooting or video playing and the user is liable to have wrong operation. Moreover, the mobile phone may be rotated during game control, photo shooting or video playing operation. The symbols and alphabet on the keys have different orientation and the user cannot identify the key for game control, photo shooting or video playing, especially when the symbols and alphabet on the keys are transparent.

SUMMARY OF THE INVENTION

The invention is to provide a multi-layer light guiding structure to control the light emission from one key or multiple keys, whereby user can clearly find the right keys.

Accordingly, the present invention provides a key module with a multi-layer light guiding structure, which includes a plurality of keys, light guiding structure and a plurality of light blocks corresponding to the light guiding structure. The light guiding structure includes a plurality of light guiding plates. Each of the light guiding plate includes at least one light guiding strip corresponding to specific keys, which are staggered to each other or corresponding to each other. The light guiding strip is provided with a color layer. An electronic device using the key module individually or selectively lights light emitting elements for each layer of the light guiding plates. Therefore, different lights are emitted from the light guiding strips or a mixed light is produced from the light guiding strips to illuminate the keys. The keys have lights of different color to manifest symbols or alphabets on the keys.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 2 shows a top view of the first preferred embodiment of the present invention.

FIG. 3 shows the light refraction path of the first preferred embodiment of the present invention.

DETAILED DESCRIPTION OF THE INVENTION

Figure 1:
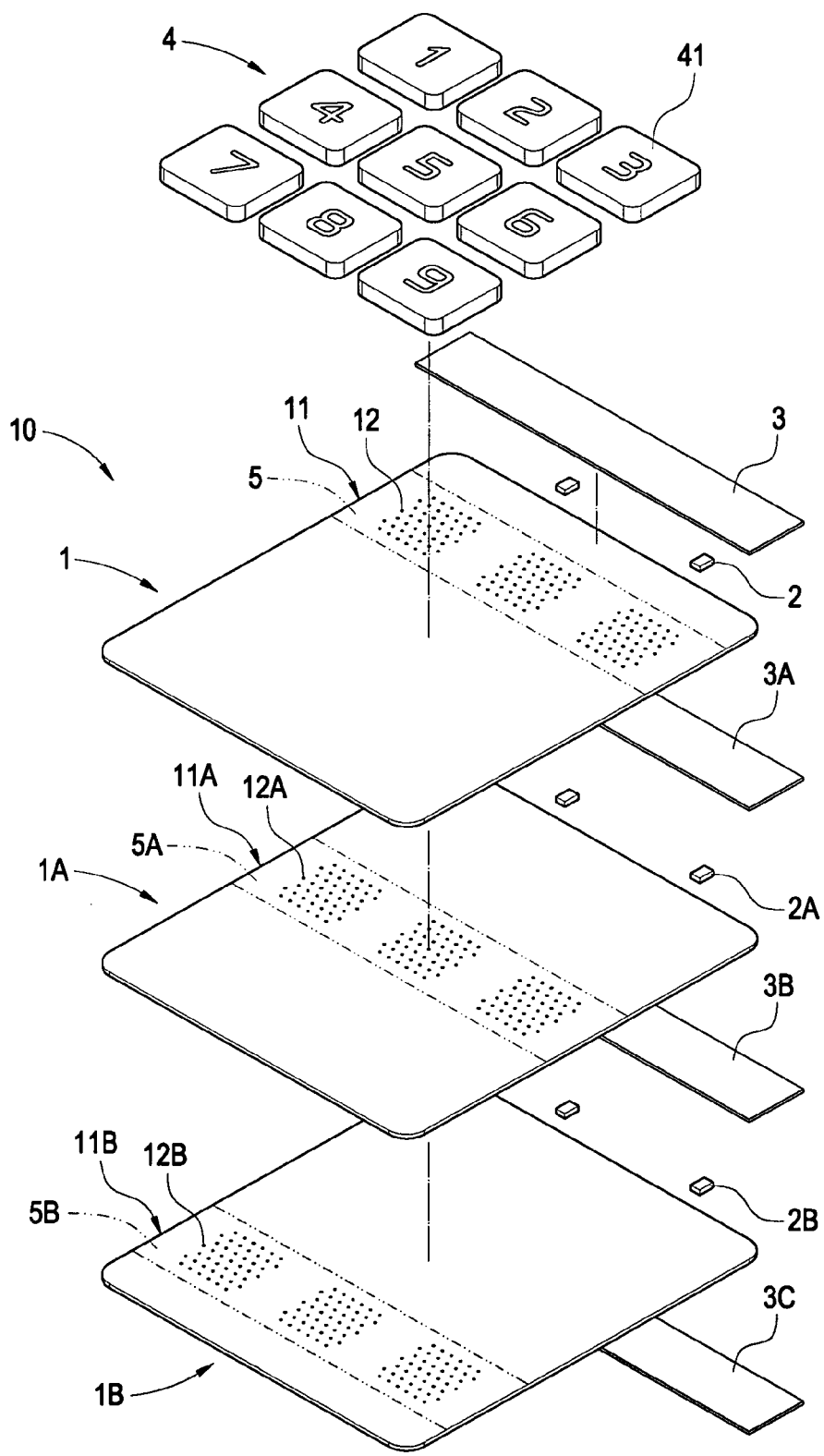
FIG. 1 shows the first preferred embodiment of the present invention.

FIG. 1 shows the first preferred embodiment of the present invention. The present invention provides a multi-layer light guiding structure 10. The multi-layer light guiding structure 10 comprises a plurality of light guiding plates 1, 1A and 1B, which comprises light guiding strips 11, 11A and 11B corresponding to keys 41. Each of the light guiding strips 11, 11A and 11B comprises pits 12, 12A, and 12B formed on the light guiding plates 1, 1A and 1B, respectively. The pits 12, 12A, and 12B change the optical paths of light to focus the light on specific key 41 through refraction. Each of the light guiding strips 11, 11A and 11B is coated with a specific color and the electronic device lights the light-emitting elements 2, 2A and 2B individually or selectively, whereby light of different color is emitted from the light guiding strips 11, 11A and 11B and illuminates the key module 4. The keys 41 on the key module 4 have illumination of different color to display the alphabets and symbols thereon. In the shown embodiment, the light-emitting elements 2, 2A and 2B are white LEDs.

The preferred embodiment is exemplified with three layers of light guiding plates.

In the first light guiding plate 1, a light-emitting element 2 is arranged on one side of the light guiding plate 1 and a light block 3 is arranged atop the light guiding plate 1 and the light-emitting element 2. The light block 3 is functioned to prevent interference of light to other light guiding plate or the key module. A light guiding strip 11 is arranged corresponding to the locations of keys 41 assigned for number "1", "2", and "3". The light guiding strip 11 is coated with red color to form red-color layer 5.

In the second light guiding plate 1A, a light-emitting element 2A is arranged on one side of the light guiding plate 1A and a light block 3A is arranged atop the light guiding plate 1A and the light-emitting element 2A. The light block 3A is functioned to prevent interference of light to other light guiding plate or the key module. A light guiding strip 11A is arranged corresponding to the locations of keys 41 assigned for number "4", "5", and "6". The light guiding strip 11A is coated with blue color to form blue-color layer 5A.

In the third light guiding plate 1B, a light-emitting element 2B is arranged on one side of the light guiding plate 1B and a light block 3B is arranged atop the light guiding plate 1B and the light-emitting element 2B. The light block 3B is functioned to prevent interference of light to other light guiding plate or the key module. A light guiding strip 11B is arranged corresponding to the locations of keys 41 assigned for number "7", "8", and "9". The light guiding strip 11B is coated with green color to form green-color layer 5B.

After the three light guiding plates 1, 1A and 1B are stacked, the light guiding strips 11, 11A and 11B are staggered to each other and corresponding to specific keys 41. Moreover, a light block 3C is provided below the third light guiding plate 1B at the last layer and the light-emitting element 2B.

Moreover, when the light-emitting elements 2, 2A and 2B are of different color, for example, red LED, green LED and blue LED, the color layer 5, 5A and 5B can be eliminated for saving cost and reducing process complexity.

FIGS. 1 to 3 show the first preferred embodiment of the present invention. The electronic device (not shown) controls light source for the multi-layer light guiding structure 10. When the light-emitting element 2 is lighted, the light is guided by the light guiding plate 1 and refracted by the light guiding strip 11 to the specific keys 41 corresponding to numbers "1", "2", and "3". The portion of keys 41 corresponding to numbers "1", "2", and "3" are hollow, therefore, red color light can emit from the keys 41 to display numbers "1", "2", and "3". The light block 3 prevents interference of light to the light guiding plate 1A or the key module 4.

When the light-emitting element 2A is lighted, the light is guided by the light guiding plate 1A and refracted by the light guiding strip 11A to the keys 41 corresponding to numbers "4", "5", and "6". The portion of keys 41 corresponding to numbers "4", "5", and "6" are hollow, therefore, blue color light can emit from the keys 41 to display numbers "4", "5", and "6". The light block 3A prevents interference of light to the light guiding plates 1 and 1B or the key module 4.

When the light-emitting element 2B is lighted, the light is guided by the light guiding plate 1B and refracted by the light guiding strip 11B to the keys 41 corresponding to numbers "7", "8", and "9". The portion of keys 41 corresponding to numbers "7", "8", and "9" are hollow, therefore, green color light can emit from the keys 41 to display numbers "7", "8", and "9". The light block 3B prevents interference of light to the light guiding plate 1A.

When the light-emitting elements 2, 2A and 2B are lighted by the electronic device, the keys 41 corresponding to numbers "1" to "9" have different displaying colors.

Figure 4:
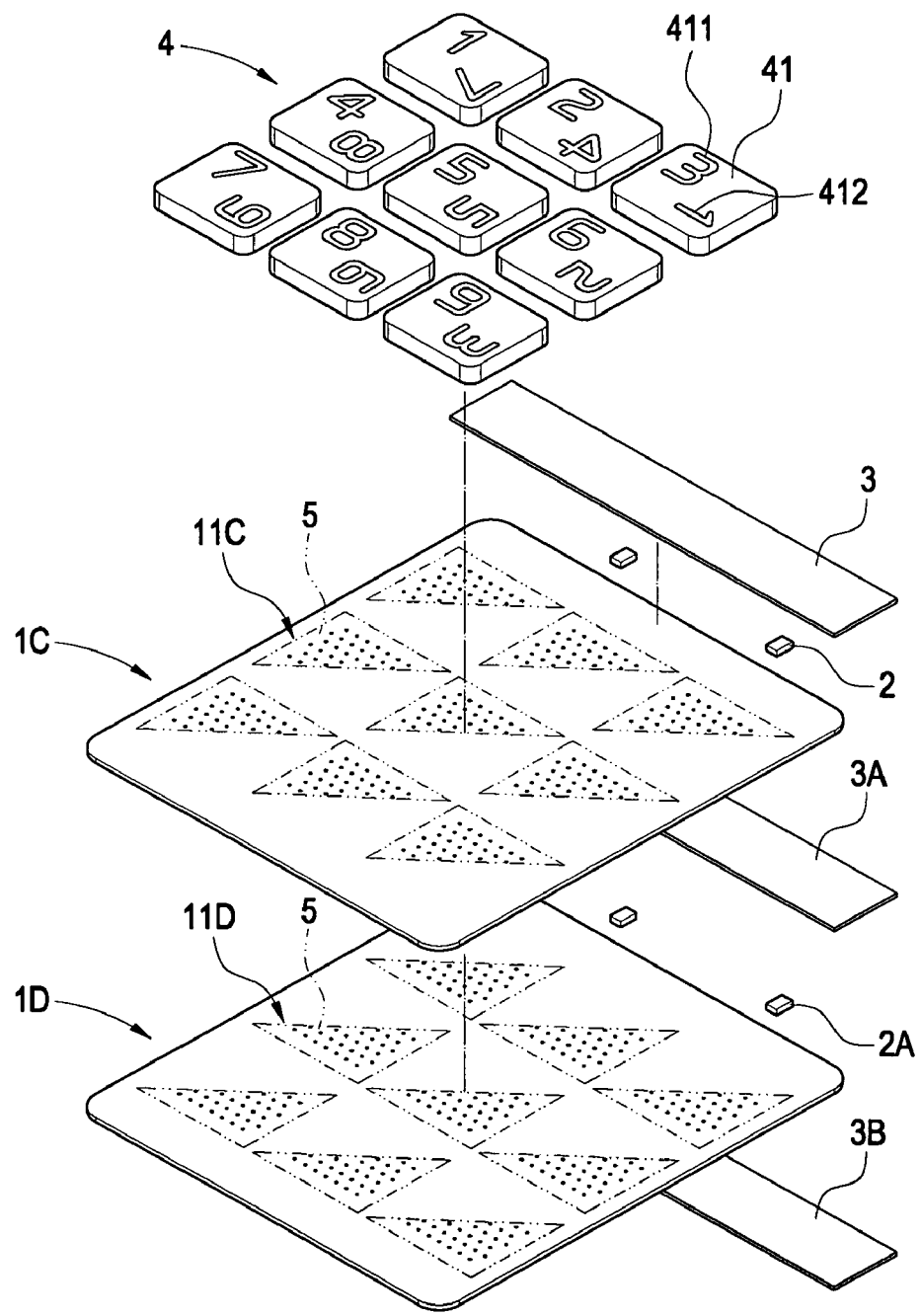
FIG. 4 shows the second preferred embodiment of the present invention.

FIG. 4 shows the second preferred embodiment of the present invention. As shown in this figure, each key 41 on the key module 4 comprises alphabets (symbols) 411 and 412 with different orientations.

The first light guiding plate 1C comprises light guiding area 11C composed of a plurality of pits. The area of the light guiding area 11C is half or less than half of the key 41. The light guiding area 11C is corresponding to the first number 411 of the key 41 and is coated with a color layer 5. A light block 3 is arranged atop the light guiding plate 1C and the light-emitting elements 2. In this figure, the light-emitting element is white LED.

The second light guiding plate 1D comprises light guiding area 11D composed of a plurality of pits. The area of the light guiding area 11D is half or less than half of the key 41. The light guiding area 11D is corresponding to the second number 412 of the key 41 and is coated with a color layer 5. A light block 3A is arranged atop the second light guiding plate 1D and the light-emitting elements 2A.

When the two light guiding plates 1C and 1D are stacked, the two light guiding areas 11C and 11D are staggered to each other and corresponding to the two numbers 411 and 412 respectively.

Moreover, when the light-emitting elements 2 and 2A are of different colors, for example, red LED and green LED, the color layers 5 can be eliminated for saving cost and reducing process complexity.

Figure 5:
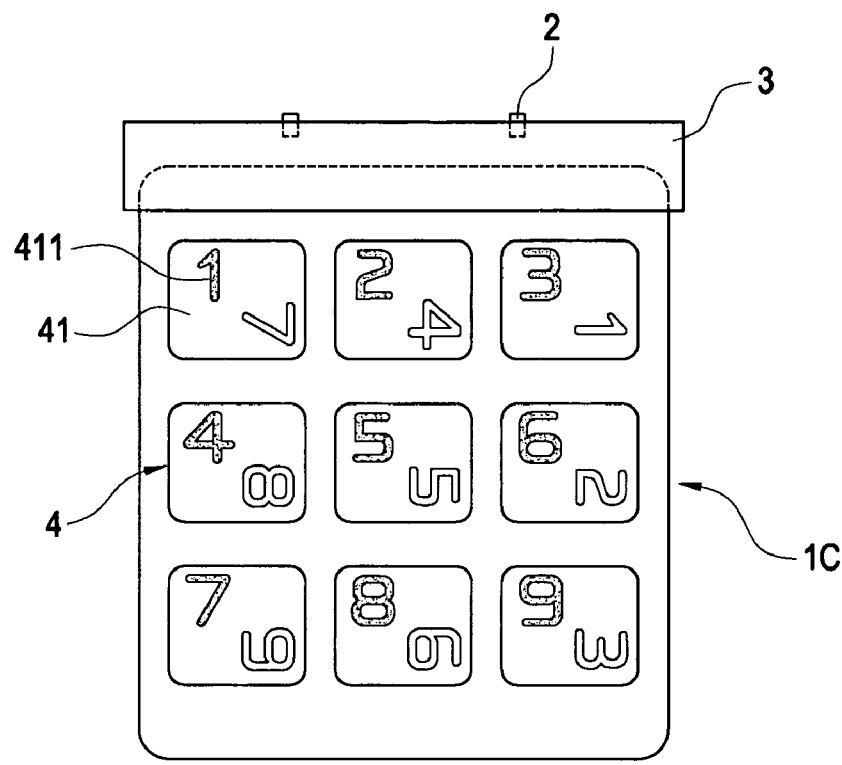
FIG. 5 shows the key according a preferred embodiment of the present invention.
Figure 6:
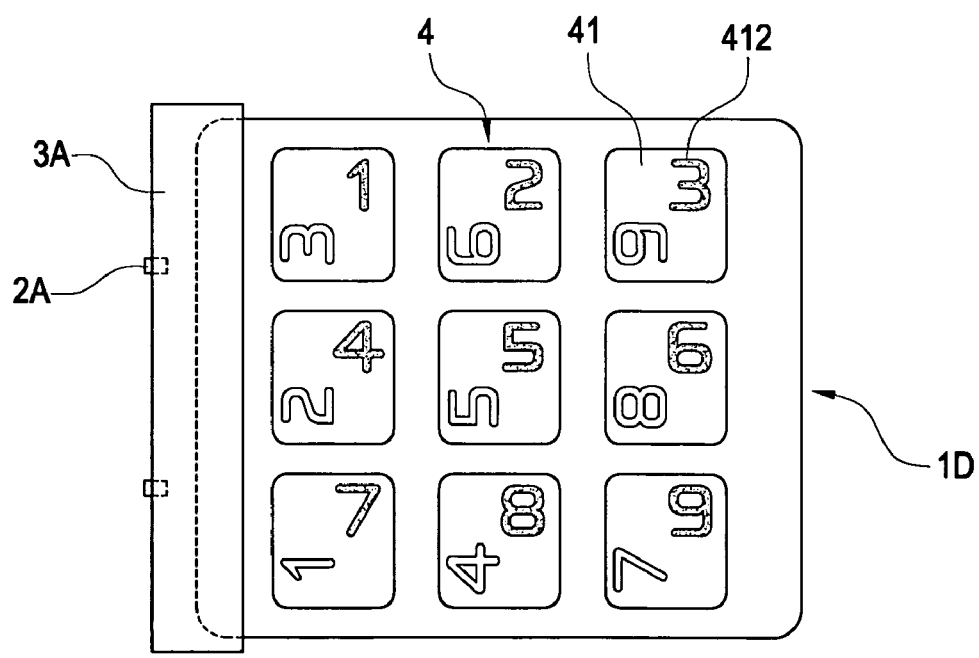
FIG. 6 shows the key in another orientation according a preferred embodiment of the present invention.

With reference to FIGS. 4 to 6, when the light-emitting element 2 is lighted by the electronic device (not shown), the light is guided by the first light guiding plate 1C and illuminates the first number 411 of the key 41 by refraction of the light guiding area 11C. Therefore, light is emitted from the first number 411 while no light is emitted from the second number 412.

When user rotates the electronic device for playing game or watching video clip, the light-emitting element 2A is lighted. The light is guided by the second light guiding plate 1D and illuminates the second number 412 of the key 41 by refraction of the light guiding area 11D. Therefore, light is emitted from the second number 412 while no light is emitted from the first number 411. Therefore, user can focus his concentration on the right number (symbol) when operating the key 41 and is not influenced by another number of different orientation.

Figure 7:
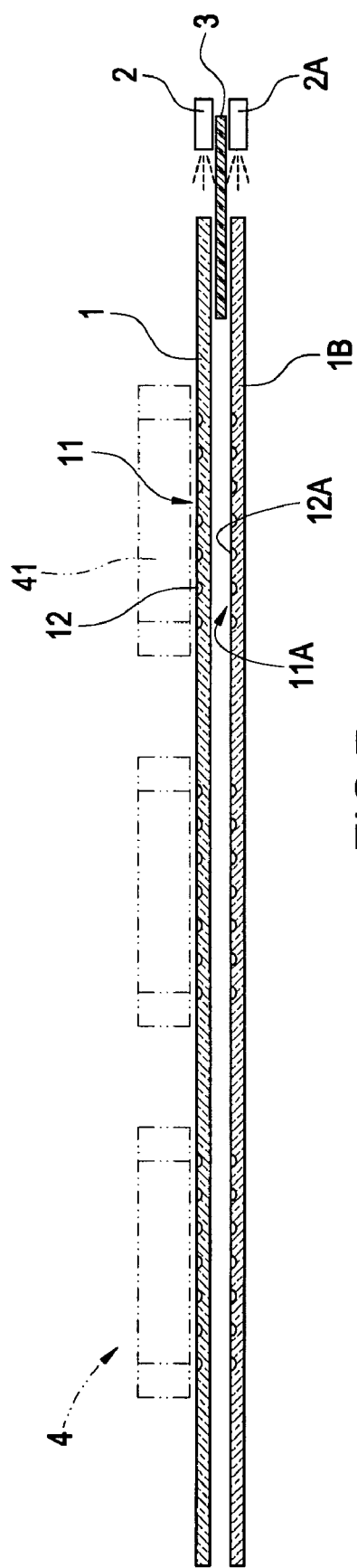
FIG. 7 shows the third preferred embodiment of the present invention.

FIG. 7 shows the third preferred embodiment of the present invention, wherein light guiding strips 11 and 11A are provided for the first light guiding plate 1 and the second light guiding plate 1A. The light guiding strips 11 and 11A are coated with different colors. Therefore, lights can be mixed when the light-emitting elements 2 and 2A are lighted at the same time. For example, when the light-emitting element 2 emits red light and the light-emitting element 2A emits blue light, the mixed color is purple.

Moreover, a light block 3 is provided between the first light guiding plate 1 and the second light guiding plate 1A, and between the light-emitting element 2 and the light-emitting element 2A to prevent interference therebetween.

When the light-emitting elements 2 and 2A are implemented with LED of different colors such as red LED and blue LED, the color layers 5 can be eliminated for saving cost and reducing process complexity.

Figure 8:
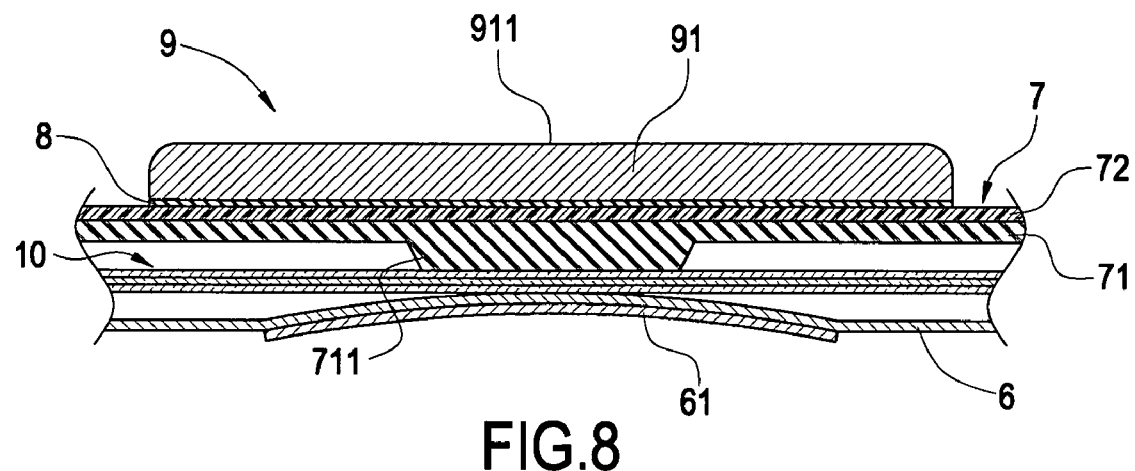
FIG. 8 shows the fourth preferred embodiment of the present invention.

FIG. 8 shows the fourth preferred embodiment of the present invention. The multi-layer light guiding structure 10 is used for a key structure. The key structure comprises a first elastic layer 6 composed a plurality of metal plates 61. When the key 91 is pressed, the metal plate 61 is in contact with circuit board of the electronic device (not shown). The metal plate 61 also produces snap sound to provide tactile effect for user.

A light guiding structure 10 is provided on the first elastic layer 6 and comprises a plurality of light guiding plates. The light guiding structure 10 and related light-emitting element and light block have been described with reference to FIGS. 1 and 7 and description thereof is omitted here for clarity.

A second elastic layer 7 is provided on the light guiding structure 10 and comprises a rubber body 71 and a rigid plastic film 72 on the surface of the rubber body 71. The rubber body 71 comprises a projection 711 on bottom thereof and corresponding to the metal plates 61.

A binding layer 8 is arranged on the second elastic layer 7.

A key module 9 is arranged on the binding layer 8 and comprises a plurality of keys 91, each of keys 91 is corresponding to a projection 711.

When the light-emitting elements are lighted individually or selectively, the light of different colors is guided by corresponding light guiding plates. Therefore, lights of different colors pass through the surface of the keys 91.

When a key 91 is pressed by external force, the projection 711 of the rubber body 71 is in contact with the light guiding structure 10 and the first elastic layer 6. Therefore, the metal plate 61 is in contact with a circuit board of the electronic device (not shown). The metal plate 61 also produces snap sound to provide tactile effect for user.

Figure 9:
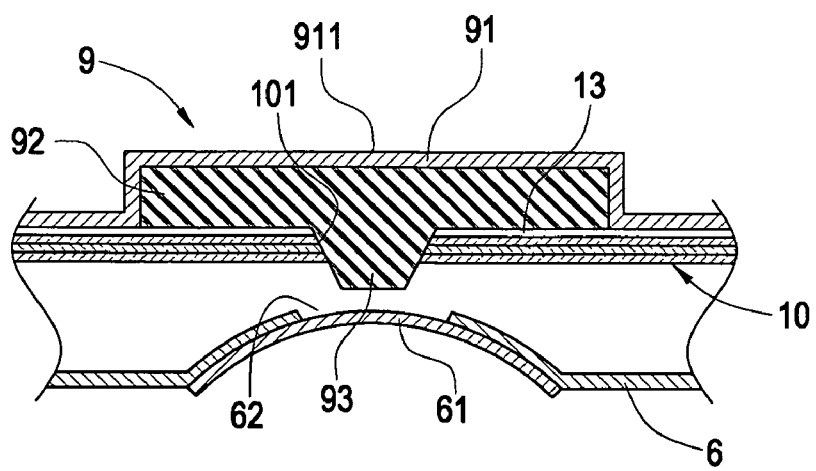
FIG. 9 shows the fifth preferred embodiment of the present invention.

FIG. 9 shows the fifth preferred embodiment of the present invention. The multi-layer light guiding structure 10 is used for a key structure.

The key structure comprises a first elastic layer 6 with a plurality of apertures 62 and a metal plate 61 on opposite face of each aperture 62. When the key 91 is pressed by external force, the metal plates 61 is in contact with a circuit board of the electronic device (not shown). The metal plate 61 also produces snap sound to provide tactile effect for user.

A light guiding structure 10 is provided on the first elastic layer 6 and comprises a plurality of light guiding plates. The light guiding structure 10 and related light-emitting element and light block have been described with reference to FIGS. 1 and 7 and description thereof is omitted here for clarity. Each of the light guiding plates comprises a through hole 101 thereon.

A key module 9 is arranged on the light guiding structure 10 and comprises a plurality of keys 91, each of keys 91 comprises a second elastic layer 92 made of transparent rubber material. A projection 93 is formed on the bottom of each second elastic layer 92 and passes through the through hole 101.

When the light-emitting elements are lighted individually or selectively, the lights of different colors are guided by corresponding light guiding plates. Therefore, lights of different color pass through the surface of the keys 91.

When the key 91 is pressed by external force, the projection 93 of the second elastic layer 92 passes through the aperture 62 and the through hole 101 and is then in contact with the metal plates 61. Therefore, the metal plate 61 is in contact with a circuit board of the electronic device (not shown). The metal plate 61 also produces snap sound to provide tactile effect for user.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A key module having a multi-layer light guiding structure, the multi-layer light guiding structure arranged in an electronic device and corresponding to a plurality of light-emitting elements; the key module comprising:
    a first elastic layer comprising a plurality of metal plates thereon;
    a light-guiding structure arranged on the first elastic layer and comprising a plurality of light-guiding plates, each of the light-guiding plates comprising at least one light-guiding strip and the light-guiding strips of different layer of light-guiding plates being staggered to each other and corresponding to specific keys, where a light block is provided between adjacent light-guiding plates and adjacent light-emitting elements;
    a second elastic layer arranged on the light-guiding structure; and
    a key module arranged on the second elastic layer and comprising a plurality of keys, each key corresponding to a projection.

2. The key module as in claim 1, wherein a binding layer is provided between the second elastic layer and the key module.

3. The key module as in claim 1, wherein the second elastic layer comprises a rubber body and a rigid plastic film on surface of the rubber body, the rubber body comprising a projection on bottom thereof.

4. The key module as in claim 1, wherein the light-guiding strip comprises a plurality of pits.

5. The key module as in claim 1, wherein the light-guiding strip comprises a color layer.

6. The key module as in claim 1, wherein the light-guiding structure comprises a plurality of light-guiding plates, each of the light-guiding plates comprises at least one light-guiding strip and the light-guiding strips are corresponding to respective keys, a color layer is provided for each light-guiding strip and a light block is arranged between two adjacent light-guiding plates and two light-emitting elements.

7. The key module as in claim 1, wherein the wherein the light-guiding structure comprises a plurality of light-guiding plates, each of the light-guiding plates comprises a plurality of light-guiding areas and the light-guiding areas are staggered to each other and corresponding to respective keys, a color layer is provided for each light-guiding area and a light block arranged between two adjacent light-guiding plates and two light-emitting elements.

8. A key module having a multi-layer light guiding structure, the multi-layer light guiding structure arranged in an electronic device and corresponding to a plurality of light-emitting elements, the key module comprising:
    a first elastic layer comprising a plurality of apertures and each aperture containing a metal plates therein;
    a light-guiding structure arranged on the first elastic layer and comprising a plurality of light-guiding plates stacked to each other, each of the light-guiding plates comprising at least one light-guiding strip and a plurality of through holes, the light-guiding strips of different layer of light-guiding plates being staggered to each other and corresponding to specific keys, where a light block is provided between adjacent light-guiding plates and adjacent light-emitting elements; and
    a key module arranged on the light-guiding structure and comprising a plurality of keys, the key comprising a second elastic layer and the second elastic layer comprising a projection passing through the through hole of each layer of light-guiding plate.

9. The key module as in claim 8, wherein the light-guiding strip comprises a plurality of pits.

10. The key module as in claim 8, wherein the light-guiding strip comprises a color layer.

11. The key module as in claim 8, wherein the light-guiding structure comprises a plurality of light-guiding plates, each of the light-guiding plates comprises at least one light-guiding strip and the light-guiding strips are corresponding to respective keys, a color layer is provided for each light-guiding strip and a light block is arranged between two adjacent light-guiding plates and two light-emitting elements.

12. The key module as in claim 8, wherein the wherein the light-guiding structure comprises a plurality of light-guiding plates, each of the light-guiding plates comprises a plurality of light-guiding areas and the light-guiding areas are staggered to each other and corresponding to respective keys, a color layer is provided for each light-guiding area and a light block arranged between two adjacent light-guiding plates and two light-emitting elements.

* * * * *